FIG. I

INVENTOR.
JOHN A. RICHARDS

June 19, 1962   J. A. RICHARDS   3,039,698
AUTOMATIC CONTROL FOR SPRINKLER SYSTEM
Filed Feb. 29, 1960   4 Sheets-Sheet 2

INVENTOR.
JOHN A. RICHARDS
BY
Barnes & Seed
attys

June 19, 1962  J. A. RICHARDS  3,039,698
AUTOMATIC CONTROL FOR SPRINKLER SYSTEM
Filed Feb. 29, 1960  4 Sheets-Sheet 3

INVENTOR.
JOHN A. RICHARDS

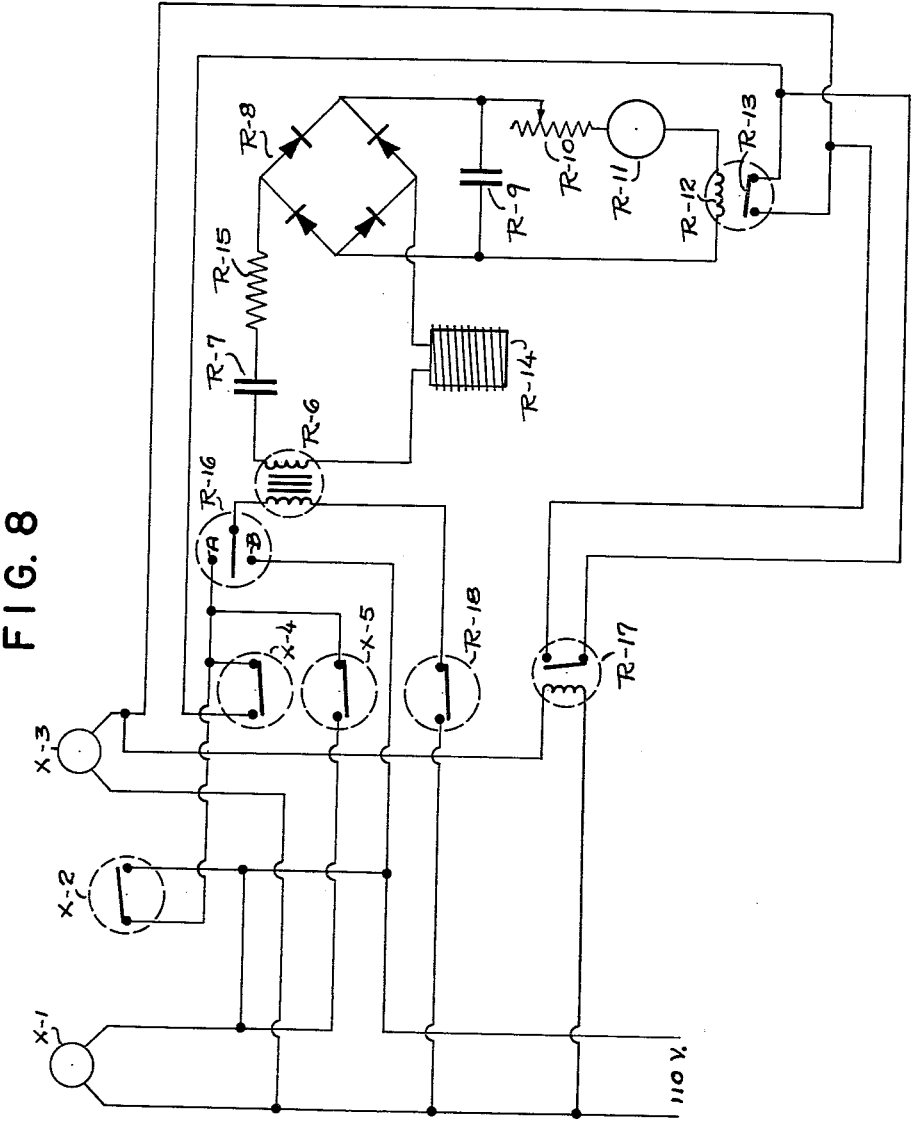

United States Patent Office 3,039,698
Patented June 19, 1962

3,039,698
AUTOMATIC CONTROL FOR SPRINKLER SYSTEM
John A. Richards, 3525 E. 93rd, Seattle, Wash.
Filed Feb. 29, 1960, Ser. No. 11,668
9 Claims. (Cl. 239—64)

This invention relates to an automatic control for sprinkler systems, being intended for use with substantially any ground watering system, and having as a particular object the provision of a control governed by the moisture condition of the ground which is to be watered.

The control peculiarly lends itself to use with sprinkler systems in which several ground areas are individually watered, each area by a single sprinkler or by a multiplicity of sprinklers, and the invention purposes to provide a control which will accomplish the following ends.

(1) Any one or all of the circuits admit of being operated manually or automatically.

(2) Moisture control for each sprinkler area is independent of the moisture control for other areas.

(3) For "automatic" operation, the control precludes any area from being watered unless the moisture condition shows that watering is needed.

(4) Any desired moisture content can be selected for any given area as a functioning control level for that area.

(5) When in "automatic" operation the control provides a visual indication of the actual moisture content of the soil in the area being watered.

(6) Instant visual indication of the relative moisture content of any given area may be ascertained at any time.

(7) Any area can be watered by manual control when desired.

(8) Any one or more areas may be "skipped" by leaving a selector switch therefor in "off" position.

The foregoing, with still additional objects and advantages in view, will appear and be understood in the course of the following description and claims, the invention consisting in the novel construction and in the adaptation and combination of parts hereinafter described and claimed.

In the accompanying drawings:

FIG. 8 is a wiring diagram illustrating a further modification embodying teachings of the present invention.

Figure 1:
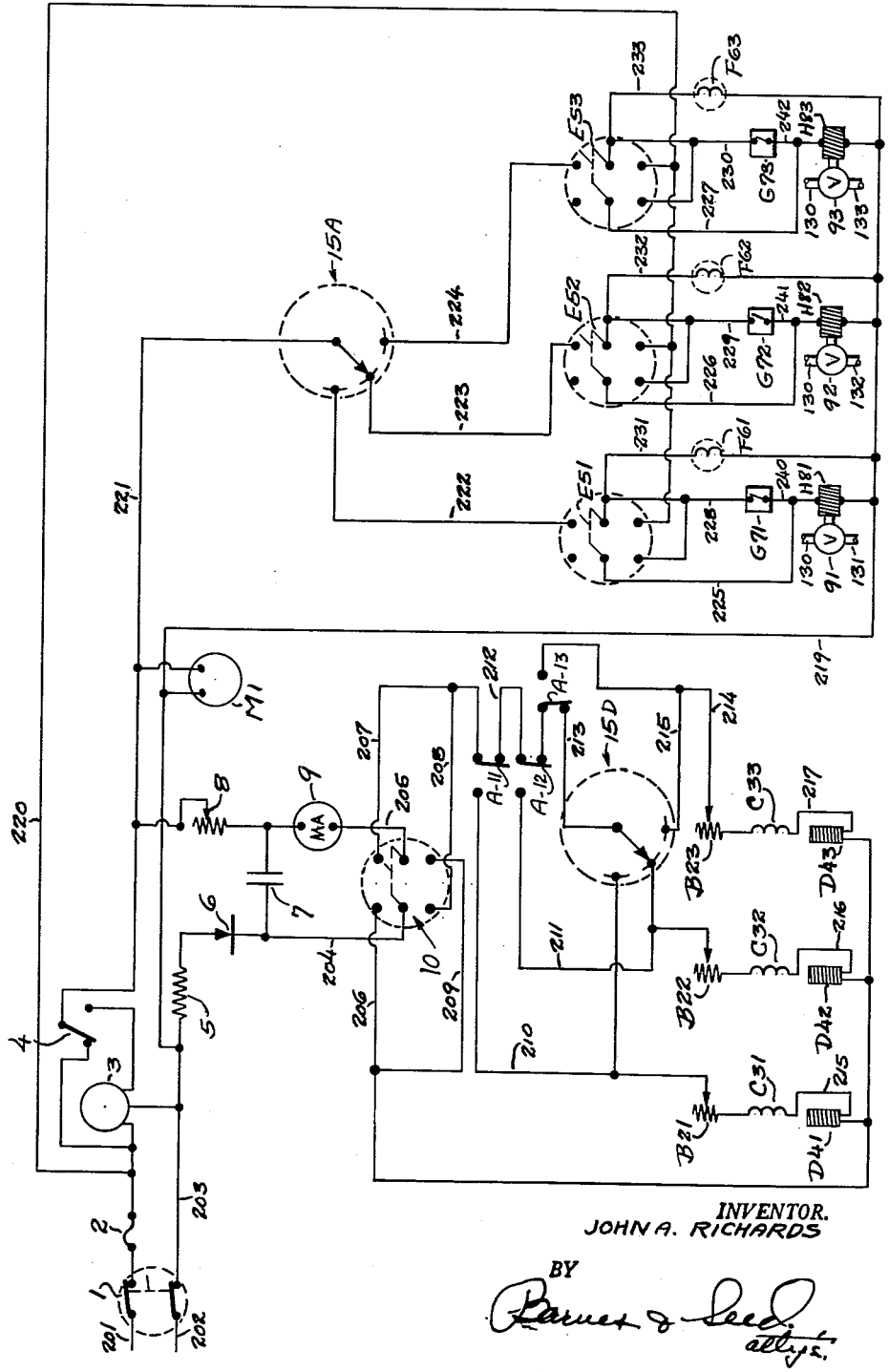
FIGURE 1 is a diagrammatic view illustrating an automatic sprinkler control embodying the preferred teachings of the present invention, and incorporating a fragmentary showing of a part of an associated sprinkler system.

Referring first to FIGS. 1 through 4 of said drawings, I have illustrated by way of example a system of three units, each of which will be hereinafter referred to as a "side." Electrically the system is divided into an A.C. part and a D.C. part. The former serves as the operating power and is rectified for D.C. to operate the control system.

The nature of the system will, it is thought, be best understood by tracing the operation but before doing so the employed electrical devices shown in the drawings are identified as follows:

A double pole single throw switch designated by the numeral 1 serves as a master control for power drawn from service lines 201—202, one of said lines being fused as at 2. A single pole single throw switch 3, clock-operated, works in conjunction with a single pole double throw micro switch 4 to open and close the line 201, with such latter switch being operated by a cam (not shown) which is driven by an electric motor M1. This motor also drives a second cam (not shown) to operate a double pole double throw micro switch 10, and additionally causes the rotary switch arms of two multiple-position switches 15A and 15D to turn in unison. These two multiple-position switches serve as automatic controls for channeling current through a multiplicity of "A.C." and "D.C." circuits, respectively.

Common to all such D.C. circuits are a resistor 5, a rectifier 6, a condenser 7, a variable resistor 8, and a meter 9. For each said circuit there is provided a respective variable resistor B–21, B–22 or B–23, and iron core coil C–31, C–32 or C–33, and a moisture sensing anode D–41, D–42, or D–43, as the case may be. Each said coil functions as the instrumentality for opening a normally closed Mercoid switch, as G–71, G–72, or G–73, contained in a related A.C. circuit. Normally establishing a series circuit between the center tap of the switch 15D and the meter 9 are three single pole double throw test switches A–11, A–12 and A–13, each of which is movable manually at will to its other contact. When so moved the series circuit is broken, bypassing the switch 15D, and there is established a completed circuit through the anode D–41, D–42 or D–43, as the case may be, the purpose being to obtain a test reading on the meter 9.

For each of the A.C. circuits, in addition to the described Mercoid switch G–71, G–72 or G–73, as the case may be, there is provided a double pole double throw switch, as E–51, E–52 and E–53, and a solenoid, as H–81, H–82 and H–83. There is also provided a test lamp as F–61, F–62 and F–63. The function of the solenoid is to open a normally closed valve, as 91, 92 and 93, introduced in a respective water pipe, as 131, 132 and 133. The sprinkler system in which these valved pipes are contained will be hereinafter described but suffice it to here say that the opening of any such valve operates to deliver irrigating water to the particular ground area in which the concerned anode D–41, D–42 or D–43 is embedded.

Also before proceeding with a trace of the operation, it is believed that clarity in an understanding will be advanced by first describing the anodes (D41–43). These anodes are basic to the functioning of the present invention and are adapted to be embedded in the ground in each of a number of zones intended to be watered by the present sprinkler system. They are each composed of a non-conductive core having two non-touching strands of conductive wire wound thereon and their purpose is to show the relative resistance imposed by the ground to a transfer of current from one to the other wire. The resistance is perforce greater or less according as the moisture content diminishes or increases. The basic concept of embedding resistance anodes in soil in an effort to detect resistance is not new. However, such have been impractical heretofore. One essential characteristic of my anode is that the two strands are crossed over, albeit without contact, and the wiring reversed at a point intermediate their lengths. This I have illustrated in FIG. 4.

Moisture control of each sprinkler "side" is independently regulated by the variable resistors, as B–21. Increasing the resistance perforce reduces the magnetic strength of the coil C–31, thus lessens its ability to open the associated Mercoid switch G–71, wherefore a greater degree of moisture is required in the vicinity of the anode D–41 to reduce the total resistance (D–41 plus B–21) to a point where coil C–31 will be energized sufficiently to actuate the Mercoid switch G–71. Conversely, decreasing resistance in the resistor B–21 decreases the moisture level, which is the governing factor.

In making the above adjustments, the meter 9 may be read visually to enable the operator to determine the degree of adjustment. Reiterating that which it is believed will have been previously understood, if the panel is in fully automatic operation such meter will indicate the soil moisture content as each circuit is contacted in turn. This is possible because the closed sides of the test switches A11–13 are wired in series with the meter and the center tap of the switch 15–D, automatically making contact through the meter on each circuit contacted. During the "off" cycle of the clock 3 the soil moisture content may be read for any circuit by depressing the test switch, as A–11, for the circuit. Depressing and such test switch will break the series circuit including the switch 15–D, simply by-passing the latter through lines 210, 211 or 214, as the case may be.

During the "off" cycle of the time clock 3 any sprinkler circuit may be operated manually by turning the selector switch for the circuit E–51, E–52, or E–53, as the case may be, to the manual position, in which case the switch 15–A and the Mercoid switches are by-passed. Current is drawn from line 220 in this instance and employs electric leads 225, 226 or 227, as the case may be.

If the operator desires one or more sprinkler circuits to be "skipped" during the automatic cycle of the panel the concerned selector switch (E–51, E–52 or E–53) is left in the "off" position. This does not affect the operation of the motor driven switch 15–A and has no affect on the operation of the remaining circuits set for automatic operation.

The double-throw double pole micro switch 10 which I have shown in the wiring hook-up, like the micro switch 4, is desirably operated by the motor M–1. Its function is to prolong the life of the anodes by reversing polarity on the D.C. control side of the system one or more times in each rotation of the control switch 15–D.

Express consideration should perhaps be here given to the provisions of the invention by means of which compensation is made for either an increase or a decrease in the conductivity of the soil due to fertilization or other causes, or a change in the resistance of the anode resulting from a non-corrected deposit of salts or other conductors on the surface. Should either condition develop, compensating correction can be made manually by means of the variable resistor 8. The procedure is as follows: When the system is first installed, the circuit resistor B–21 and the correcting resistor 8 are set in known positions which can later be duplicated. These settings have no relationship to any given meter reading. At the same time the ground area in which the anode is embedded is completely saturated to again create a condition which can be later duplicated. At this point a meter reading is taken and recorded. At any future date the two resistances can be set at their original positions and when the anode areas are saturated the meter reading will be identical providing the soil conductivity or the resistance of the anode has not changed. If a change in the meter reading has occurred due to either condition or a combination of both, a complete correction can be effected by adjusting the correcting resistance until the meter reading is the same as that originally recorded. At this point the system will function in regard to soil moisture coefficient exactly as it did when the original reading was taken and recorded.

If at any time the build-up of conducting material on the anode should approach or reach a point wherein it has lost its sensitivity and moisture to resistance relationship it can be returned to its original "clean" condition free of any conducting surface deposit by putting it across a high (250 to 500 v.) voltage source. This in effect "burns off" any conducting material with no detrimental effects to the anode and again, when the resistances are set to their original positions and the anode area saturated, the meter reading will be as originally recorded, providing the conductivity of the soil itself has not changed. If soil conductivity has changed, adjustment of the correcting resistor 8 will return the meter to its original reading and the system to its original accuracy.

Proceeding now to trace the operation, and first considering normal use, the three 3-position selector switches E51–53 are located in their "automatic" position. The master switch 1 is closed and the clock-operated switch 3 is open, as is the micro switch 4.

When the clock-operated switch 3 reaches the time for which it is set, power is supplied to both the A.C. and the D.C. circuits of the system. The motor M–1 responsible for turning the switches 15–A and 15–D is now powered and as it approaches the first contact the cam driven thereby and responsible for operating the micro switch 4 inactivates the latter to cause the clock circuit to be by-passed. The object served is to prevent switches 15–A and 15–D from stopping in mid-cycle should the clock 3 reach its "off" point at such time.

When switch 15–D now closes the contacts of the #1 side of the system, coil C–31 becomes energized. the circuit from one power line 201 passing through the micro switch 4, lines 221, 205, 207, 212, 213, 210 to one side of such coil, and from the other side of such coil passes through the anode D–41 and lines 206, 204 and 203 to the other power line 202. Such coil C–31, the magnetic field of which is governed by the resistances imposed collectively by (1) the related variable resistor, as B–21, and (2) the related anode D–41, is operatively interconnected with the related magnetically operated Mercoid switch, this being the switch G–71. If the field is sufficient, evidencing light resistance, such Mercoid switch which normally is closed will be opened. The solenoid H–81 which governs valve 91 has its circuit closed only when the related Mercoid switch is closed, wherefor an opening of the latter breaks the solenoid circuit. In a manner to be described, the #1 sprinkler side remains in this case static. Such light resistance will perforce have reflected a moisture condition exceeding a predetermined level below which sprinkling becomes desirable.

Assume, however, that the moisture content is below this level, and that this message has been hence telegraphed by the presence of a magnetic field insufficient to open the Mercoid switch, A.C. current flows through solenoid H–81 causing the associated valve 91 to open. This valve is associated with a first "field" of sprinkler heads. Valves 92 and 93 are associated with a second "field" and a third "field," respectively. The circuit for said solenoid H–81 is from power line 201 through micro switch 4, thence by lines 221, 222 and 228 to the Mercoid switch G–71, therefrom by line 240 to one side of the solenoid H–81, returning to the other power line 202 by connecting lines 219 and 203.

As the switches 15–D and 15–A continue to be driven by motor M–1, circuits are closed in turn through (1) the Mercoid switch G–72 and the solenoid H–82 and (2) the Mercoid switch G–73 and the solenoid H–83. Motor M–1 will perforce continue to drive switches 15-A and 15-D until the prime power circuit is broken by the time clock 3.

Figure 2:
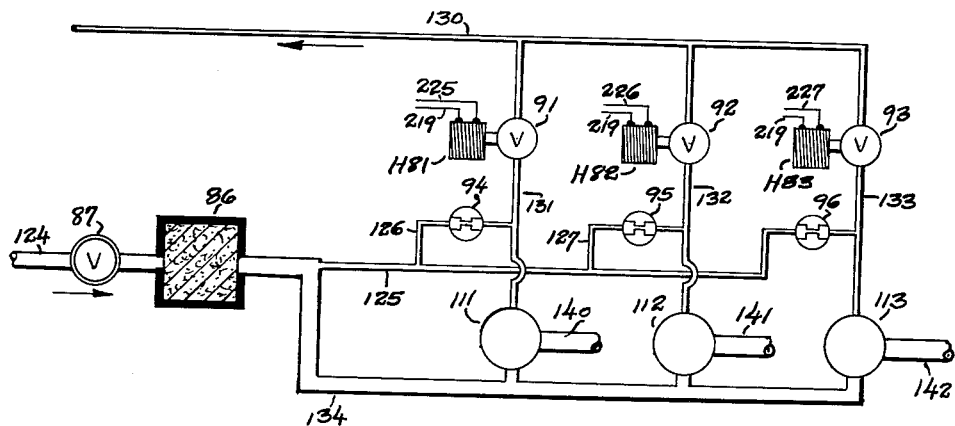
FIG. 2 is a diagrammatic view illustrating, by way of example, an existing sprinkler system of the type to which the present invention readily adapts itself, this view incorporating only so much of the control as is necessary to correlate the same to the sprinkler.
Figure 3:
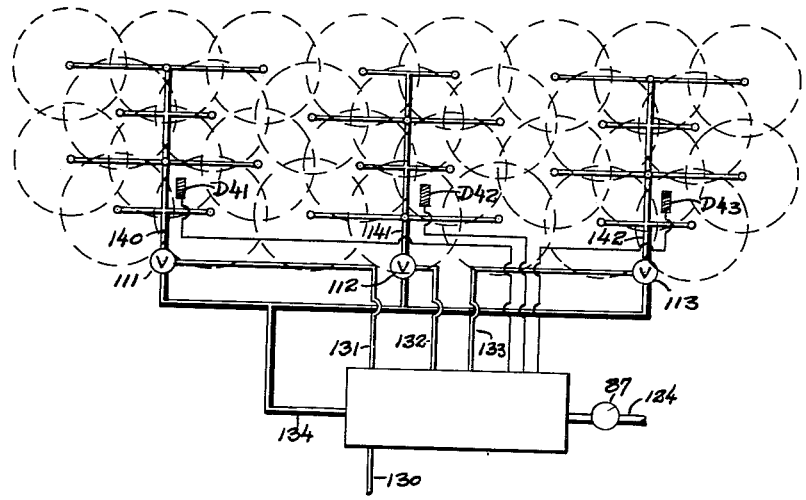
FIG. 3 is a diagrammatic view portraying a multiplicity of sprinkler heads distributed over several ground areas, and incorporating so much of associated control and sprinkler equipment as is considered necessary to clearly picture the application of the present invention.
Figure 4:
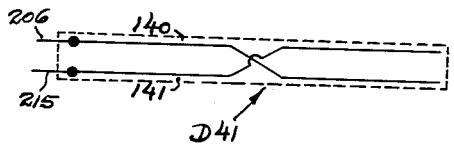
FIG. 4 is a diagrammatic view of a ground-embedded anode used in the present control, and particularly illustrating the cross-over which I find to be of vital import in assuring efficient functioning of the system.

The sprinkler system which I prefer to employ is of the well-known nature, see FIGS. 2 and 3, in which master valves 111, 112 and 113 controlling flow of water through pipes 140, 141 and 142 to the sprinkler heads of a given area are normally held in closed position by differential pressure of water fed into a valve dome from the supply line. Bleeding off water from the dome side of the master valve, at a rate faster than an incoming trickle flow, imposes source pressure upon the other side of the valve and causes the latter to open. Upon interrupting the "bleed" discharge, hydraulic pressure again builds up in the dome to close the valve. The valves 91, 92, 93 perform said bleed function. 91, 92 and 93 represent "bleed" valves for the respective sides of the system, each being opened by a related solenoid, as H-81, H-82 or H-83 and having a flow capacity, when open, greater than the volume of water which admits of being passed through respective constantly-open trickle-flow fittings 94, 95 and 96. The supply pipe is denoted by 124 and leads by a manifold 134 to the several said master valves. A manifold 125 also fed from said manifold 134 connects, by branches 126, 127 and direct, with fittings 94, 95 and 96 to provide a constant trickle flow to respective pipes 131, 132 and 133 extending between the domed heads of the master valves and the solenoid-operated valves 91, 92 and 93. The discharge sides of these valves connect with a drain pipe 130. Pat. No. 2,631,610, issued Mar. 17, 1953, to E. L. Gaines, shows a master valve of the general type here described, and namely a differential valve in which line pressure is the influence responsible for opening the valve and is opposed by pressure of water trickling into the dome of the valve from the same source and overriding said opening influence in consequence of being applied to a surface the area of which is greater than that of the surface against which the valve-opening pressure is applied. When water is bled from the dome through the referred-to "bleed" valve 91, 92 or 93 at a rate faster than the trickle in-flow, the opposing pressure perforce drops below the line pressure and the master valve opens.

Figure 5A:
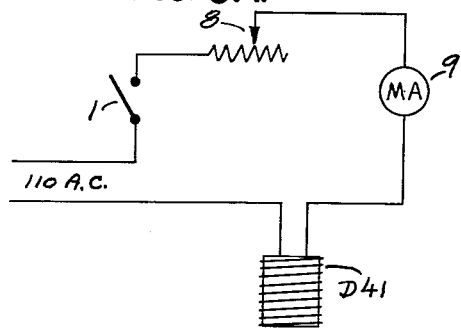
FIGS. 5A and 5B show two wiring diagrams embodying the anode of the present invention used simply for the reading of moisture conditions and applied in one instance to an A.C. meter and in the other instance to a D.C. meter.

In FIG. 5A I have portrayed a simple A.C. moisture indicating device. In this, as with the circuits shown in FIGS. 5B, 6 and 7, the same reference characters as those employed in the preceding views are used to designate corresponding parts. Describing the operation of FIG. 5A, when switch 1 is closed a circuit is completed from the power source through the resistor, ammeter, and anode. Relative moisture content of the soil varies the resistance in the anode with a resultant reading on the ammeter. The variable resistor 8 is used to correct for changes in soil conductivity not related to moisture.

Figure 5B:
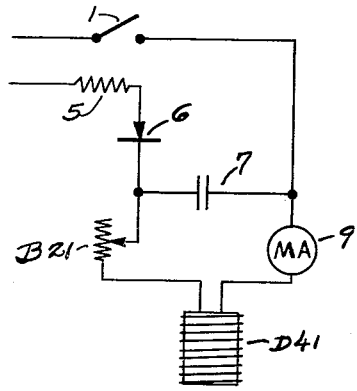

A simple D.C. moisture indicating device is diagrammed in FIG. 5B. When switch 1 is closed a circuit is completed through the indicated parts to an A.C. power source. The rectifier 6 passes current in one direction only, thus creating a D.C. current flow. Capacitor 7 is a filter condenser which smoothes out the D.C. pulsations. Resistor 5 is a limiting element used to reduce current flow in the circuit. The circuit functions in a fashion identical to that of FIG. 5A.

Figure 6:
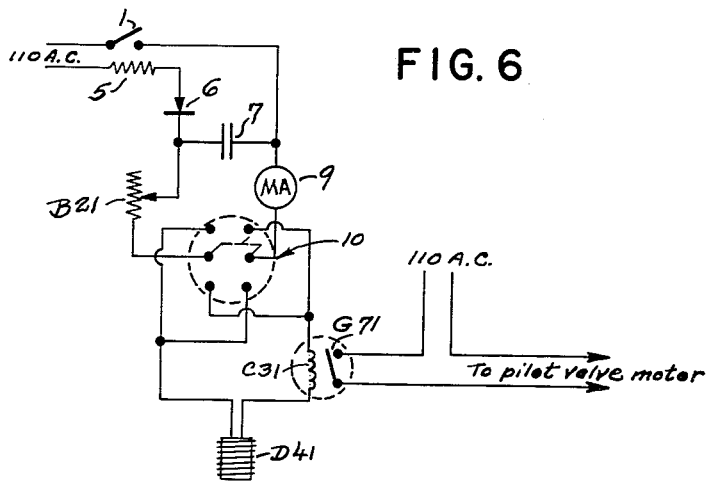
FIG. 6 is a wiring diagram showing teachings of the invention applied to a sprinkler system of the pilot valve operated type.

The circuit shown in FIG. 6 is a control circuit used in conjunction with existing timer-actuated sprinkler controllers, and operates on rectified direct current. When the timing device closes or bridges the switch 1 the circuit is energized and then performs in the same fashion as the circuit of FIG. 5B excepting that coil C-31 is energized in proportion to the total resistance created by resistors 5, B-1, and anode D-41. Switch 10 is used only to periodically reverse polarity in the anode circuit to reduce electrolytic damage to the anode. This switch can be eliminated if the anode is wired in series ahead of the rectifier so as to cause the anode to operate on A.C. Resistor B-21 corrects for changes in soil conductivity not related to moisture content and simultaneously adjusts the circuit so as to be sensitive to a given amount of soil moisture, and thus provides a means which permits the sprinkler system to maintain any desired soil moisture content. When said switch 1 is closed or bridged one of two actions will result, depending on the pre-set resistance in B-21 and the resistance in the anode, which is a factor of soil moisture content:

(1) If the soil resistance is relatively high, coil C-31 will not be sufficiently energized to open the magnetically operated switch G-71 and current will flow through the pilot valve circuit thus causing irrigation to occur.

(2) If the total resistance is relatively low, coil C-31 will be energized sufficiently to hold the magnetically operated snap switch G-71 open, thus breaking the circuit to the pilot valve and preventing irrigation.

Figure 7:
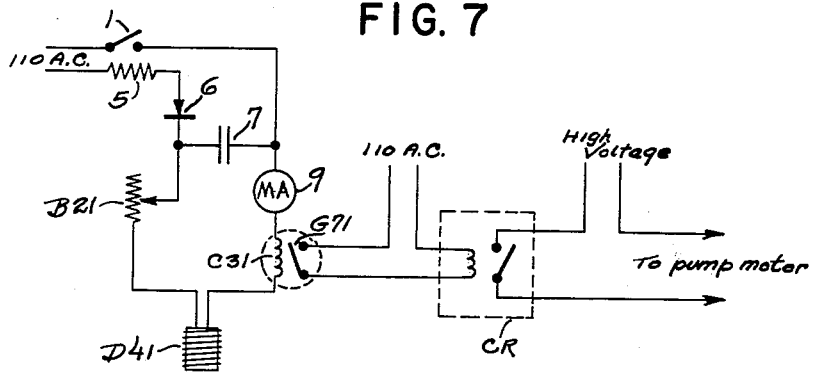
FIG. 7 is a wiring diagram showing the invention as applied to a pump-operated type of sprinkler system.

The circuit shown in FIG. 7 is identical in operation to that of FIG. 6 and is subject to the same changes and adjustments. The difference is that the magnetically operated snap switch G-71 closes the circuit to a magnetic starter or relay CR, thus allowing the controller to actuate large pumps, electrically operated valves, etc., which would be beyond the current carrying capacity of the snap switch.

The system which I have illustrated in FIG. 8 indicates teachings of the present invention applied to a conventional pilot valve circuit such, for example, as the well-known Moody control. In this diagram the prefix "X" designates typical pilot valve controller components. The prefix "R" designates electric devices employed in conjunction therewith to produce a 24 volt system with an A.C. anode and D.C. control. The system will be readily understood by tracing the operation.

The time clock X-1 is operatively connected with micro switch X-2, closing the latter at a pre-set time. Manual switch X-4 is in its "on" position, and switch R-16 is in its automatic position passing current to the primary of the transformer R-6 so as to supply power to the ground-controlled (anode R-14) circuit. If the combined resistance of anode R-14 and variable resistor R-10 is sufficient the Mercoid switch R-13 remains in its normally closed position. There is in such instance a completed circuit to the pilot valve motor X-3 causing same to rotate and operate each of the hydraulically controlled sprinkler valves (not shown) in sequence. The circuit for relay R-17 is simultaneously completed, its function being to hold the motor circuit closed until such motor X-3 has made a complete revolution, thereby precluding the motor from stopping in mid-cycle. It is pointed out that switch X-2 remains closed only until switch X-5 is closed. A cam (not shown) on the motor X-3 performs this closing function, the switch remaining closed until the motor X-3 completes one full revolution, provided that Mercoid switch R-13 has not been opened due to a given high moisture level in the vicinity of the ground-embedded anode R-14, in which case the relay R-17 performs the function of switch X-5.

Anode R-14 is the controlling device for all hydraulically operated valves controlled by the pilot valve and may be placed in conjunction with any of these valves.

Resistance R-10 is used for adjustment of the system to provide for any desired soil moisture condition. Increasing the resistance will require wet soil to shut the system off. Decreasing the resistance will allow dryer soil to shut the system off.

Switch X-2 may be closed any number of times per 24-hour period.

Soil moisture content may be read on the meter R-11 at any time without operating the system by turning switch R-16 to the lower "B" position.

By using only the components bearing the prefix "R" the system can be converted to act as a pump starter through a standard magnetic starter by eliminating relay R-17 and changing switch R-16 to a single pole single throw unit. The system would then start and stop the pump in accordance with soil moisture content which in turn would be adjustable through resistance R-10.

In the concerned diagram R-8 denotes a full-wave rectifier. R-12 is a 24 volt D.C. coil. Condenser R-7 blocks D.C. current from the anode. R-9 is likewise a condenser, while R-15 is a limiting resistor. R-18 is a manual switch which is normally placed in closed position and acting when in open position to isolate the "R" circuit and allow the system to function strictly as a clock-controlled unit.

It is believed that the invention will have been clearly understood from the foregoing description of my now-preferred illustrated embodiment. No limitations are to be implied, the intention being that the hereto annexed claims be given the broadest interpretation to which the employed language fairly admits.

What I claim is:

1. In a control for the type of irrigating system in which the flow of irrigating water from a pressure source to several areas which are to be irrigated is governed by a respective one of several normally closed solenoid valves, the combination with said solenoid valves, a respective magnetically operated switch for each of said solenoid valves operatively interconnected therewith so that an electric circuit is completed through the solenoid of the concerned valve when the switch is closed, a respective electric coil for each of said magnetically operated switches so associated therewith that the latter is closed and opened according as the magnetic field of the coil is below or above a given value, a respective electric resistor for each of said electric coils, said resistors being arranged to be embedded in the soil of said several areas and employing the moisture in said soil as a resistance medium, a respective variable resistor for each of said electric coils, a single variable resistor for all of said electric coils, and a respective normally incomplete series electric circuit including a circuit-closing switch for each of said electric coils and said resistors.

2. The control recited in claim 1 in which the last-named circuit-closing switches are clock-operated so as to be closed and opened in sequence.

3. In a control for the type of irrigating system in which the flow of irrigating water from a pressure source to several areas which are to be irrigated is governed by a respective one of several normally closed solenoid valves, the combination with said valves, a respective normally open electric circuit for each of said solenoid valves including a normally closed magnetically operated switch in series with the solenoid, a respective electric coil for each said magnetically operated switch so associated therewith that the latter is opened and closed according as the magnetic field of the coil is above or below a given value, a respective electric resistor for each of said electric coils, said resistors being arranged to be embedded in the soil of said several areas and employing the moisture in said soil as a resistance medium, a respective variable resistor for each of said electric coils, a single variable resistor for all of said electric coils, a respective normally incomplete series electric circuit for each of said electric coils and the related resistors, a respective normally incomplete series electric circuit for each of the solenoid valves and the related magnetically operated switch, two sets of respective normally open circuit-closing switches one for the first-named and the other for the last named electric circuits, and means common to both of said sets of switches operating to close and open related switches in timed sequence.

4. The control recited in claim 3 in which the means for opening and closing said two sets of switches is clock-operated.

5. The control recited in claim 3 in which the means for opening and closing said two sets of switches comprises an electric motor energized by a normally open electric circuit including an electric clock as its circuit-closing instrument.

6. Structure according to claim 5 having means activated and inactivated by the electric motor for by-passing the electric clock after the motor circuit has been completed.

7. A control according to claim 3 in which there is provided for each of said electric coils and the related resistors a normally open electric test connection by-passing the concerned circuit-closing switches of said recited two sets of switches, said test connections each including a manually operated circuit-closing switch.

8. Structure according to claim 1 in which said magnetically operated switches are wired in series with clock-operated switches which are closed and opened in timed sequence, and having for each circuit a respective manually operated switch permitting any given circuit to be held open at will without interfering with the sequential operation of the remaining circuits.

9. Structure as recited in claim 8 characterized in that any given circuit may be completed at will during periods when the clock is inactive.

References Cited in the file of this patent

UNITED STATES PATENTS

| | | |
|---|---|---|
| 2,695,976 | Hasenkamp | Nov. 30, 1954 |
| 2,721,101 | Richard | Oct. 18, 1955 |
| 2,768,028 | Robinson | Oct. 23, 1956 |

FOREIGN PATENTS

| | | |
|---|---|---|
| 1,177,789 | France | Dec. 8, 1958 |